United States Patent Office 3,367,899
Patented Feb. 6, 1968

3,367,899
POLYURETHANES PREPARED FROM PRE-
POLYMERS AND CYANURIC ACID HY-
DRAZIDES
Wilhelm Thoma, Cologne-Flittard, and Heinrich Rinke
and Harald Oertel, Leverkusen, Germany, assignors to
Farbenfabriken Bayer Aktiengesellschaft, Leverkusen,
Germany, a German corporation
No Drawing. Filed July 18, 1963, Ser. No. 296,093
Claims priority, application Germany, July 27, 1962,
F 37,434
7 Claims. (Cl. 260—30.2)

ABSTRACT OF THE DISCLOSURE

Polyurethane polymers are prepared by reacting in an inert solvent (1) an NCO terminated perpolymer prepared by reacting (a) an excess of an organic diisocyanate with (b) an organic compound containing active hydrogen atoms that are reactive with NCO groups to form polyurethanes, with (2) cyanuric acid dihydrazides present in an amount of from about 100 to about 110 mol percent based on the NCO groups present in the prepolymer.

This invention relates to polyurethane polymers, and a method of preparing same. More particularly, it relates to polyurethane polymers suitable in the preparation of highly elastic articles such as foils and fibers.

It has been heretofore known to react isocyanate-modified polyhydroxy compounds in solvents with chain extending agents such as diamines, water, hydrazides such as carbodihydrazide, adipic acid dihydrazide, hexamethylene bis-semicarbazide and butane-1,4-bis-carbazinic ester and to process these solutions to form foils and fibers. Particularly good results with respect to elastic properties are obtained when diamines and dihydrazides are used.

When diamines are used, however, it is technically difficult to carry out the polyisocyanate-polyaddition reaction because of the extraordinarily high reaction velocity encountered and further, there is frequently an undesirable swelling of the reaction mass during the reaction. This disadvantage does not occur when hydrazides are used since the active hydrogen atoms of the group —CO—NH—NH$_2$ react with —NCO groups at a substantially more moderate rate than the active hydrogen atoms of an amino group of an aliphatic diamine. It is therefore possible to produce stable solutions which can be satisfactorily shaped when hydrazides are used as the chain extending agents. Nevertheless, when hydrazides and semicarbazides are employed in the polyaddition reaction, it is difficult to conduct the process for the reason that these compounds are substantially insoluble in ordinary solvents and therefore require highly polar and usually hot solvents such as dimethylformamide at a temperature of from 70 to 100° C. If such polar solvents are not used either water or the concurrent use of water with organic solvents must be employed. The use of water is disadvantageous for the reason that it is a precipitant for the elastomer. Another disadvantage of using hydrazides, semicarbazides and bis-carbazinic esters is that the products produced as a result of the polyaddition reaction yield colored complexes with various heavy metal ions. The extent of such a phenomenon is that an elastomer prepared from an isocyanate-modified polyhydroxy compound and carbohydrazide becomes deep blue in color in the presence of zinc acetate. This is particularly undesirable when fibers are prepared which find their ultimate use in the garment industry.

It is therefore an object of this invention to provide new compounds which react with NCO groups. It is another object of this invention to provide an improved method of preparing polyurethane polymers. It is still another object of this invention to provide improved polyurethane polymers. It is a further object of this invention to provide highly elastic polymers not subject to the formation of colored complexes with heavy metal ions.

The foregoing objects and others which will become apparent from the following description, are accomplished in accordance with the invention, generally speaking, by providing compounds having the formula

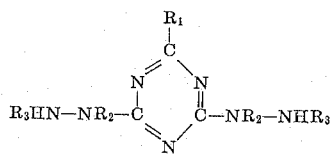

wherein $R_1$ is hydrogen, chlorine, —$OR_2$, —$NR_2R_3$, alkyl, aryl, aralkyl, cycloalkyl; and $R_2$ and $R_3$ are hydrogen, alkyl, aryl, aralkyl or cycloalkyl and polyurethane polymers prepared by reacting these cyanuric acid hydrazides in solution with an NCO terminated prepolymer prepared by reacting a substantially linear organic compound containing active hydrogen atoms which are reactive with —NCO groups to prepare polyurethanes and having a molecular weight of at least about 700 with an excess of an organic diisocyanate. When using the cyanuric acid hydrazides to prepare polyurethanes, $R_1$ can also be —$NHNH_2$. The cyanuric acid hydrazide should be present in an amount of from 100 mol percent to about 110% based on the NCO groups present in the NCO terminated prepolymer.

Any suitable alkyl radical may be represented by $R_1$, $R_2$ or $R_3$ such as, for example, methyl, ethyl, propyl, isopropyl, butyl, isobutyl, sec-butyl, tert-butyl, amyl and the various positional isomers thereof; the corresponding straight and branched chain isomers of hexyl, heptyl, octyl, nonyl, decyl, undecyl, dodecyl, pentadecyl, nondecyl and the like. Any suitable aryl radical may be represented by $R_1$, $R_2$ or $R_3$ such as, for example, phenyl, naphthyl, anthryl and the like. Any suitable aralkyl radical may be represented by $R_1$, $R_2$ and $R_3$, such as, for example, benzyl, phenylethyl, phenylpropyl, phenylisopropyl, phenylbutyl, phenylisobutyl, naphthylmethyl, naphthylethyl and the like. Any suitable cycloalkyl radical may be represented by $R_1$, $R_2$ and $R_3$ such as, for example, cyclopropyl, cyclobutyl, cycloamyl, cyclohexyl, cycloheptyl, cyclooctyl and the like. In the formula above, $R_2$ and $R_3$ may be alike or different.

The chain extenders to be used according to the invention for the reaction of isocyanate-modified compounds containing terminal NCO groups to form elastomers with urethane and semi-carbazide groups as well as cyanuric acid rings are distinguished from diamines by a reduced reactivity with respect to isocyanates. However, it is just by this moderated reactivity that the carrying out of the reaction on a technical scale is greatly facilitated. Viscous, smoothly running solutions of the elastomer are obtained and the swelling of the reaction mass due to undesired secondary reactions, which occurs quite frequently when diamines are used, is avoided.

By comparison with the chain extenders described in German patent specification 1,123,467, the cyanuric acid hydrazides are characterized by generally better solubility, so that a solution of the chain extender at a temperature of 20° C. can be reacted with the initial adduct solution. As a consequence, the addition of water for dissolving the hydrazide and which acts as a precipitant for the elastomer becomes superfluous. In contrast to the products extended with the hydrazides of German patent specification 1,123,467, the elastomers produced according to the invention show practically no discoloration or only very slight discoloration with heavy metal salts.

As stated above, the novel chain extending agents are reacted with isocyanate-terminated compounds prepared by reacting organic compounds containing active hydrogen atoms which react with NCO groups to form polyurethanes and having a molecular weight of at least about 700 with an excess of an organic diisocyanate. Any suitable organic compound containing active hydrogen atoms reactive with NCO groups to form polyurethanes may be used such as, for example, hydroxyl polyesters, polyalkylene ether glycols, polyalkylene thioether glycols, dihydric polyacetals and the like.

Any suitable hydroxyl polyester may be used such as those obtained, for example, from a dicarboxylic acid and a dihydric alcohol. Of course, the term "hydroxyl polyester" includes hydroxyl polyester amides which may be obtained from the above-defined ingredients with the addition of some organic diamine or amino alcohol such as ethylene diamine, propylene diamine, hexanediamine, piperazine, ethanol amine, propanol amine and the like. Any suitable polyhydric alcohol may be used such as, for example, ethylene glycol, 1,2-propylene glycol, dimethyl-1,3-propanediol, 1,4-butanediol, pentane-1,5-diol, hexane-1,6-diol, hexane-2,5-diol, decane-1,10-diol and the like. Any suitable polycarboxylic acid may be used such as, for example, adipic acid, succinic acid, sebacic acid, suberic acid, phthalic acid, terephthalic acid, glutaric acid, azelaic acid, nonane-dicarboxylic acid, thiodipropionic acid, maleic acid and the like.

On account of the greatly improved resistance to hydrolysis, there are preferably to be used those polyesters which are produced from glycols containing at least 5 carbon atoms and which are transformed with less than equivalent quantities of diisocyanates into polyester urethanes, for example, a polyester of hexanedial and adipic acid having a molecular weight of 1000, which has been converted with ½ mole of toluylene diisocyanate into a polyester urethane of the approximate molecular weight 2200. It is also possible to use mixtures of the aforementioned polyester starting materials.

Any suitable polyalkylene ether glycol may be used such as, for example, those obtained by the condensation of an alkylene oxide either alone or together with a polyhydric alcohol. Any suitable alkylene oxide may be used such as, for example, ethylene oxide, propylene oxide, butylene oxide, amylene oxide, and the like as well as epihalohydrins such as epichlorohydrin and aralkylene oxides such as styrene oxide and the like. Any suitable polyhydric alcohol may be used such as those more particularly set forth above for use in the preparation of the polyester. The polyhydric polyalkylene ethers may be prepared by any suitable process such as that disclosed by Wurtz in 1859, "Encyclopedia of Chemical Technology," volume 7, pages 257–262, published in Interscience Publishers, Inc. (1951) and in U.S. Patent 1,922,459.

Any suitable polyalkylene thioether glycol may be used such as, for example, that obtained by the condensation of thiodiglycol with itself or with an alkylene oxide or polyhydric alcohol as set forth above.

Any suitable polyacetal may be used such as, for example, those obtained by condensing dihydric alchols with aldehydes. Any suitable dihydric alcohol may be used as, butanedioxyethyl glycol or diethylene glycol, ethylene glycol and any of those mentioned above with regard to the preparation of polyesters. Any suitable aldehyde may be used, such as, for example, formaldehyde, acetaldehyde, butyraldehyde and the like.

Any other suitable polyhydroxyl compound having a molecular weight of at least 700 such as, for example, polycarbonates having terminated hydroxyl groups, linear polymerization of products of butadiene, isoprene and the like which products contain hydroxyl groups may be used.

It is preferred that the active hydrogen compound have a molecular weight of from about 700 to about 5000 and for best results from about 800 to about 2000, and a melting point below 60° C. and for best results, preferably below 45° C. These preferred ranges give the best elastic properties especially at low temperatures.

Any suitable organic diisocyanate can be used in reaction with the organic compound containing active hydrogen atoms to obtain the NCO terminated prepolymer used in the process of this invention such as, for example, diphenylmethane-4,4'-diisocyanate, 2,4 - toluylene diisocyanate, 2,6-toluylene diisocyanate, 1,5-naphthylene diisocyanate, 1,4-naphthylene diisocyanate, xylylene diisocyanate, tetramethylene diisocyanate, hexamethylene diisocyanate, p-phenylene diisocyanate, m-phenylene diisocyanate, diphenyl sulphone-4,4'-diisocyanate, 1,4-cyclohexane diisocyanate, 4,4' - hexahydrodiphenylmethane diisocyanate, furfurylidene diisocyanate and the like.

It is preferred that symmetrical aromatic diisocyanates such as 1,4-phenylene diisocyanate, 4,4'-diphenyl diisocyanate, 4,4'-diphenylmethane diisocyanate, 4,4'-diphenyl dimethylmethane diisocyanate, dibenzyl diisocyanate and the like be used. The use of 4,4'-diphenyl dimethylmethane diisocyanate and hexamethylene diisocyanate leads to products having excellent stability to light.

In the preparation of the NCO terminated intermediate prepared by reacting the organic compound containing active hydrogen atoms with an excess of an organic diisocyanate, the diisocyanate is used in an amount of from about 1.5 to about 4 mols and preferably about 1.75 to about 2 mols of diisocyanate per mol of active hydrogen containing compound. With a molar ratio below 1:2, compounds are formed with which there is still a certain linking of the individual molecules of the active hydrogen containing compounds, but free NCO groups are present at the ends. With a molar ratio of exactly 1:2, only the ends of the chains of the active hydrogen containing compounds are provided, by way of urethane groups, with free NCO groups, whereas with molar ratios greater than 1:2, free diisocyanate exists in addition to the compounds of high molecular weight carrying isocyanate groups. This reaction can be effected in known manner by reacting the organic compound containing active hydrogen atoms (hereafter referred to for simplicity as the polyhydroxy compound) after dehydration for about 1 hour in vacuo at 130° C., at high temperature, preferably 80–130° C., with the diisocyanate, or by mixing the polyhydroxy compound with a solution of the diisocyanate in an inert solvent such as methylene chloride, acetone, benzene or dioxane and by slowly raising the temperature, possibly while distilling off the solvent, and by the reaction taking place for a sufficient period of time (about 1 to 2 hours) at high temperature (preferably 90–110° C.).

The reaction can also be carried out in the presence of small quantities of trifunctional alcohols (less than 5% of the OH number of the polyhydroxy compound), such as trimethylolethane or trimethylolpropane, or trifunctional isocyanates, and the reaction should lead only to such weakly branched products as to preclude a gel formation.

The substantially linear, isocyanate-modified polyhydroxy compounds are preferably converted at room temperature or only slightly elevated temperature into approximately 50% solutions, preferably by adding solvents which are highly polar liquids, dissolve polyacrylonitrile and are inert with respect to NCO groups. These solutions are reacted, possibly after further dilution, with a dilute and approximately 1 to 10% solution of the compounds of the indicated formula.

Any suitable solvent such as, for example, dimethyl formamide, dimethyl acetamide, dimethyl propionamide, N-methyl pyrrolidone, hexamethyl phosphorus amide, tetramethylene sulphone and dimethyl sulphoxide and the like, which can be blended with other solvents, such as dioxane, tetrahydrofuran and glycol methyl ether acetate and the like may be used.

The following are specific examples of suitable compounds having the indicated formula:

cyanuric acid-1-chloride-3,5-dihydrazide (s-triazine-1-chloro-3,5-dihydrazine),
s-triazine-1,3-dihydrazine,
cyanuric acid-3,5-dihydrazide,
cyanuric acid-1-methyl-ester-3,5-dihydrazide,
1-amino-cyanuric acid-3,5-dihydrazide,
1-(N-phenylamido)-cyanuric acid-3,5-dihydrazide,
1-(N,N-diethylamido)-cyanuric acid-3,5-dihydrazide,
1-(N-methyl-N-phenylamido)-cyanuric acid-3,5-dihydrazide,
cyanuric acid-1,3,5-trihydrazide,
1-phenyl-s-triazine-3,5-dihydrazine,
1-isopropyl-s-triazine-3,5-hydrazine.

It is also possible in the preparation of polyurethane polymers to use mixtures of the cyanuric acid hydrazides which have been listed by way of example.

In order that the molecular weight of the elastomers may be regulated if desired, the hydrazine compounds of the general formula can be reacted together with small quantities, preferably 0.1–4%, of mono-functional hydrazide compounds, for which purpose the following are suitable: acethydrazide, hydrazomonocarboxylic acid ethyl ester, benzhydrazide, cyanuric acid-1,3-dichloride-5-monohydrazide and 1,3-bis-(N,N-dimethylamido)-cyanuric acid-5-monohydrazide.

In similar manner, the use of the dihydrazide compounds in a slight excess of the quantity corresponding to the NCO content has an effect in the sense of a lower molecular weight of the products obtained by the process. A reaction with dihydrazide compounds in a quantity less than the equivalent quantity relative to the NCO content leads to products of high molecular weight with initiation of cross-linking. However, a cross-linking is only desirable to such a degree that the product of the process remains dissolved.

In order to carry out the reaction, the solution of the dihydrazide compounds is quickly stirred into the strongly stirred solution of the isocyanate-modified polyhydroxy compound, a rise in viscosity with formation of the end product of high molecular weight taking place after a short time, said product containing atom groupings of the following type in repetition:

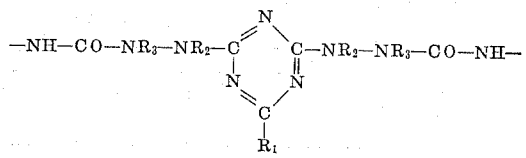

wherein $R_1$, $R_2$ and $R_3$ have the meaning set forth above. It is also possible for a solution of the dihydrazide compounds to be added dropwise to the solutions of the isocyanate-modified polyhydroxy compounds or for the solutions of the two components to be combined in suitable mixers in a continuous or discontinuous manner. It is also possible to introduce the solution of an isocyanate-modified polyhydroxy compound into a solution of the dihydrazide compound. The solutions obtained are clear, colorless or almost colorless solutions having a viscosity of about 1 to 800 P/20° C. and a solid content of about 10–40%. They are stable in storage. In order to pass from products of low viscosity to those of higher viscosity, the solutions can also be concentrated by evaporation, for example at 60–80° C. in vacuo. Pigments and fillers, such as titanium dioxide, and also light stabilizers and oxidation stabilizers and heavy metal complex formers can be introduced into the solutions.

The shaping from the solution may be effected by means of nozzles. For this purpose, the solution, for example a dimethyl formamide solution of about 1 to 800 P/20° C. is spun into hot water or aqueous solvent mixtures and the thread is allowed to coagulate to its maximum strength, perhaps by standing in hot water, or solution of about 50 to 800 P/20° C. are spun through a tunnel having a length of several meters and which is heated to about 150 to 250° C. the thread being formed by evaporation of the solvent. The thread is wound, possibly with injection of talcum into the tunnel and/or after applying talcum. In certain circumstances the thread of the rubber-like polymer, can be further stretched by about 1.1 to 3 times through a short heating zone at a temperature of about 130 to 200° C., the elasticity modulus of the threads generally increasing with decreasing total elongation. The stretching can be set by heating to temperature of about 100 to 170° C. However, such an after-treatment is generally dispensed with in connection with the products of the process on account of their already high moduli. The threads are stable, colorless, and are also very resistant to hydrolysis if the starting materials have been suitably chosen. The said products have an elastic elongation of 400 to 900%, a relatively high modulus and excellent tensile strength. They are suitable as textile materials since they are very resistant to rubbing and to solvents which are used for cleaning fabrics. The elastic-mechanical properties of the products are also outstanding. Thus, they have a small permanent elongation, an only slight decrease in tension under load, show a small amount of flow under a suspended load and a good power-elongation behavior. Since they can be spun in monofilar or multifilar form as threads having very small thickness of about 4 den. up to threads of about 500 den., they are very suitable for the manufacture of elastomeric fabrics of low weight and high restoring power, such as are more especially required in the corsetry industry, for the manufacture of medicinal articles and for many everyday elastic articles, such as bathing suits or sports clothing. Also in admixture with other textile fibers which are not highly elastic, the said highly elastic threads can be worked in proportions of about 3 to 35% and produce fabrics having elastic properties, good crease recovery and reduced tendency to pilling.

Highly elastic foils can be obtained from the solutions by means of suitable casting devices and by evaporation of the solvent. They are clear, light in color, highly elastic with a high elasticity modulus, with high tensile strength and tearing strength, and have a good, non-tacky surface quality. Molded elements can also be produced by the dipping method. By applying the solutions to textile supports and evaporating the solvent, excellent coatings are obtained which are non-tacky on the surface deformable with a high elasticity and with good resistance to hydrolysis and very good light stability. They constitute a very important technical advance over known coatings consisting of polyisocyanates and polyhydroxy compounds, which are introduced as two components, since they are obtained from a stable, prepared solution merely by removing the solvent and the problem of the so-called pot-life is obviated.

The invention is further illustrated but not limited by the following examples in which parts are by weight unless otherwise specified.

*Example 1*

About 200 parts of a polyester of ethylene glycol and adipic acid (OH number 54.0; acid number 2.0) are dehydrated for about 1 hour in vacuo at about 130° C. and heated with about 44.4 parts of 4,4'-diphenylmethane diisocyanate (molar ratio 1:1.75) for about 1 hour at about 100° C. After dissolving the melt in dry dioxane and diluting the solution with about 800 parts of dimethyl formamide, the NCO content of the solution is found to be 0.374%.

A solution of 10.32 parts of 1-(N,N-diethylamido)-cyanuric acid-3,5-dihydrazide in about 160 parts of dimethyl formamide and at a temperature of about 20° C. is added dropwise over a period of about 15 minutes to about 1100 parts of the said polyester urethane solution, which is also at about 20° C. An appreciable rise in viscosity of the 17.3% solution is observed. The solution, concentrated to a solid content of 24.5% by distilling off solvent in vacuo, has a viscosity of 52.5 P/20° C.

This solution can be spun at a delivery rate of about 1.2 ml./min. through a 12-aperture nozzle with passages having a diameter of 0.15 mm. into a water bath with a length of about 2 m. and at a temperature of about 90° C. and the highly elastic threads thereby obtained are wound onto a bobbin at a speed of 10 m./min. The thread is dried after it has stood for several hours in water at a temperature of about 50° C. The dried thread has the following properties:

| | |
|---|---|
| Count _____den__ | 90 |
| Tensile strength (based on the original count) g./den__ | 0.51 |
| Tensile strength (based on the count on fracture) g./den__ | 4.70 |
| Elongation, percent _____ | 800 |
| Permanent elongation (measured after repeated elongation by 300% with an elongation speed of 400% min., 30 seconds after relieving the load), percent _____ | 20 |
| Elasticity modulus (150%) _____g./den__ | 0.053 |
| Elasticity modulus (300%) _____g./den__ | 0.100 |
| Decrease in tension (after elongation of the thread to 300% at a speed of 400%/min. and standing for 30 seconds), percent _____ | 18 |

A foil obtained by casting the solution in a layer having a thickness of 0.7 mm. and evaporating the solvent has the following properties:

| | |
|---|---|
| Tensile strength _____kg./cm.$^2$__ | 400 |
| Elongation, percent _____ | 690 |
| Tension value at 20% _____kg./cm.$^2$__ | 13.3 |
| Tension value at 300% _____kg./cm.$^2$__ | 47.8 |
| Resistance to further tearing (according to Graves) kg./cm.$^2$__ | 30.3 |
| Microhardness _____ | 51 |

The 1-(N,N-diethylamido)-cyanuric acid-3,5-dihydrazide used as extender is prepared by reacting 1-(N,N-diethylamido)-cyanuric acid-3,5-dichloride (M.P. 79° C.) with hydrazine hydrate in dioxane at about 100° C. For purification purposes, it is recrystallized from 1.5 ml./g. of methanol. Yield 72%; M.P. 99–100° C. $C_7H_{16}N_8$ (212.3).

Calculated: C, 39.60; H, 7.60; N, 52.79. Found: C, 39.43; H, 7.61; N, 52.82.

*Example 2*

About 100 parts of a polyester of ethylene glycol, 1,4-butylene glycol (molar ratio 1:1) and adipic acid (molecular weight 2000) are dehydrated for about 1 hour in vacuo at about 130° C. and heated with about 22.2 parts of 4,4'-diphenylmethane diisocyanate for about 1 hour at about 100° C. After dissolving the melt in about 120 parts of dry dioxane and diluting the solution with about 400 parts of dimethyl formamide, the NCO content of the solution was found to be 0.331%.

A solution of about 5.32 parts of 1-(N-methyl-N-phenylamido)-cyanuric acid-3,5-dihydrazide in about 60 parts of dimethyl formamide and at a temperature of about 20° C. is introduced all at once into about 550 parts of the said polyester urethane solution, which is at a temperature of about 10° C. The viscous solution is spun in a manner analogous to Example 1 to form highly elastic threads, which have the following properties:

| | |
|---|---|
| Count _____den__ | 99 |
| Tensile strength (based on the original count) g./den__ | 0.4 |
| Elongation, percent _____ | 770 |
| Permanent elongation, percent _____ | 15 |
| Elasticity modulus (150%) _____g./den__ | 0.033 |

A foil obtained by casting the solution in a layer having a thickness of 0.7 mm. and evaporating the solvent has the following properties:

| | |
|---|---|
| Tensile strength _____kg./cm.$^2$__ | 400 |
| Elongation, percent _____ | 710 |
| Tension value at 20% _____kg./cm.$^2$__ | 6.6 |
| Tension value at 300% _____kg./cm.$^2$__ | 44 |
| Resistance to further tearing (according to Graves) kg./cm__ | 28 |
| Microhardness _____ | 47 |

The 1-(N-methyl-N-phenylamido)-cyanuric acid-3,5-dihydrazide used as chain extender is obtained by reacting 1-(N-methyl-N-phenylamido)-cyanuric acid-3,5-dichloride (M.P. 131–132° C.) with hydrazine hydrate in dioxane at about 100° C. For purification purposes, it is recrystallized from 3 ml. of dimethyl formamide and 1 ml. of water/g.

Yield 90%, M.P. 160–161° C.

$C_{10}H_{14}N_8$ (246.3) calculated: C, 48.77; H, 5.73. Found: C, 48.73; H, 5.96.

*Example 3*

A solutioin of about 2.95 parts of 1-(N-phenylamido)-cyanuric acid-3,5-dihydrazide in about 100 parts of dimethylformamide at a temperature of about 70° C. is added dropwise to about 275 parts of a polyester urethane solution prepared according to Example 1 and having an NCO content of 0.390%, this taking place with good mixing and at 5–10° C. The extending reaction occurs with a strong rise in viscosity of the solution. The 14.4% solution has the viscosity of 50 P/20° C. and can be spun in excellent manner as described in Example 1 to form elastic threads.

| | |
|---|---|
| Count _____den__ | 91 |
| Tensile strength (based on the original count) g./den__ | 0.32 |
| Elongation, percent _____ | 790 |
| Permanent elongation, percent _____ | 18 |
| Elasticity modulus (150%) _____g./den__ | 0.048 |

A foil obtained by casting the solution to give a layer having a thickness of about 0.7 mm. and evaporating the solvent has the following properties:

| | |
|---|---|
| Tensile strength _____kg./cm.$^2$__ | 402 |
| Elongation, percent _____ | 725 |
| Tension value at 20% _____kg./cm.$^2$__ | 6.3 |
| Tension value at 300% _____kg./cm.$^2$__ | 39.3 |
| Resistance to further tearing (according to Graves) kg./cm__ | 27 |
| Microhardness _____ | 46 |

The 1-(N-phenylamido)-cyanuric acid-3,5-dihydrazide used as chain extender is prepared by reacting cyanuric chloride in the aqueous phase with aniline and soda in a first reaction step and (without isolating the intermediate product 1-(N-phenylamido)-cyanuric acid-3,5-dichloride) with hydrazine and soda in a second step. For purification purposes, the product is dissolved and reprecipitated from 5 ml./g. of dimethyl formamide with 10 ml./g. of water.

Yield 62%; M.P., 187° C.

$C_9H_{12}N_8$ (232.3) calculated: C, 46.54; H, 5.21. Found: C, 46.17; H, 5.15.

*Example 4*

A solution of about 2.04 parts of 1-amido-cyanuric acid-3,5-dihydrazide in about 300 parts of dimethyl sulphoxide and at a temperature of about 80° C. is initially provided and about 275 parts of a polyester urethane solution prepared according to Example 1 and having an NCO content of 0.40% are added dropwise thereto while mixing well. A 9.2% elastomer solution is obtained having a viscosity of 10.1 P/20° C., which can be spun in a manner analogous to Example 1 to give elastic threads.

Whereas a spinning solution prepared according to

German patent specification 1,123,467 by extending the initial adduct with carbodihydrazide, adipic acid dihydrazide or hexane-bis-semicarbazide becomes strongly discolored, for example, deep blue, after a short time when zinc acetate in dimethyl formamide is for example added, there is practically no discoloration in the present spinning solution after adding zinc acetate in dimethyl formamide, even after 24 hours.

| | |
|---|---|
| Count _____ den__ | 120 |
| Tensile strength (based on original count) g./den__ | 0.51 |
| Elongation, percent _____ | 780 |
| Permanent elongation, percent _____ | 15 |
| Elasticity modulus (150%) _____ g./den__ | 0.085 |

A foil obtained by casting the solution with a layer thickness of 0.7 mm. and evaporating the solvent has the following properties:

| | |
|---|---|
| Tensile strength _____ kg./cm.² __ | 450 |
| Elongation, percent _____ | 640 |
| Tension value at 20% _____ kg./cm.² __ | 5.3 |
| Tension value of 300% _____ kg./cm.² __ | 84 |
| Resistance to further tearing (according to Graves) kg./cm. __ | 46.3 |
| Microhardness _____ | 46 |

The 1-amido-cyanuric acid-3,5-dihydrazide used as chain extender is obtained by reacting the readily available 1-amidocyanuric acid-3,5-dichloride with hydrazine hydrate in dioxane.

Yield 96.2%, M.P. 250° (with decomposition).

*Example 5*

About 200 parts of a polyester urethane solution (0.390% NCO) prepared as described in Example 1 are initially supplied at about 20° C. A solution of about 2.00 parts of 1-phenyl-s-triazine-3,5-dihydrazine in about 40 parts of dimethyl formamide and at a temperature of about 20° C. is added dropwise thereto over a period of about 5 minutes while mixing well. The viscous solution is concentrated to a solid content of about 25%. A foil obtained by casting the solution in a layer having a thickness of 0.7 mm. and evaporating the solvent has an elongation of 790% with a tensile strength of 300 kg./cm.².

The 1-phenyl-s-triazine-3,5-dihydrazine used as chain extender is obtained by reacting 1-phenyl-s-triazine-3,5-diamine with hydrazine hydrate in a bomb tube (150° C./7 hours).

Yield 65%, M.P. 160° C.

$C_9H_{11}N_7$ (217.2) calculated: C, 49.77%; H, 5.11%. Found: C, 49.74%; H, 5.13%.

It is of course to be understood that the scope of the invention is not to be limited by the particular examples set forth above but that any of the organic compounds containing active hydrogen atoms, organic diisocyanates, cyanuric hydrazides and solvents set forth in the specification may be substituted for those specifically used in the examples.

Although the invention has been described in considerable detail for the purpose of illustration, it is to be understood that variations can be made by those skilled in the art without departing from the spirit of the invention and scope of the claims.

What is claimed is:

1. Polyurethane polymers prepared by the process which comprises reacting in an inert solvent (1) an NCO terminated prepolymer prepared by reacting (*a*) an excess of an organic diisocyanate with (*b*) an organic compound containing active hydrogen atoms which are reactive with NCO groups to form polyurethanes, said compound having a molecular weight of at least about 700 with (2) a compound having the formula

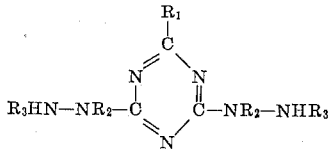

wherein $R_1$ is a member selected from the group consisting of hydrogen, chlorine, —$OR_2$, —$NR_2R_3$, —NH—$NH_2$, alkyl, aryl, aralkyl and cycloalkyl; $R_2$ and $R_3$ are members selected from the group consisting of hydrogen, alkyl, aryl, aralkyl and cycloalkyl, said compound represented by the formula being present in an amount of from about 100 to about 110 mol percent based on the NCO groups present in said NCO terminated prepolymer.

2. Polyurethane polymers prepared by the process which comprises reacting in an inert solvent which dissolves polyacrylonitrile (1) an NCO terminated polymer prepared by reacting (*a*) an excess of an organic diisocyanate with (*b*) an organic compound containing active hydrogen atoms which are reactive with NCO groups to form polyurethanes, said compound having a molecular weight of at least about 700 with (2) a compound having the formula

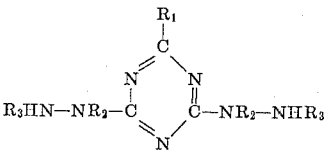

wherein $R_1$ is a member selected from the group consisting of hydrogen, chlorine, —$OR_2$, —$NR_2R_3$, —NH—$NH_2$, alkyl, aryl, aralkyl and cycloalkyl; $R_2$ and $R_3$ are members selected from the group consisting of hydrogen, alkyl, aryl, aralkyl and cycloalkyl, said compound represented by the formula being present in an amount of from about 100 to about 110 mol percent based on the NCO groups present in said NCO terminated polymer.

3. The polyurethane polymers of claim 2 wherein the organic compound containing active hydrogen atoms is a hydroxyl polyester prepared by reacting a dihydric alcohol with a dicarboxylic acid.

4. The polyurethane polymers of claim 2 wherein the organic compound containing active hydrogen atoms is a polyalkylene ether glycol.

5. The polyurethane polymers of claim 2 wherein the organic diisocyanate is 4,4'-diphenylmethane diisocyanate.

6. The polyurethane polymers of claim 2 wherein said solvent is selected from the group consisting of dimethyl formamide, dimethyl acetamide, tetramethyl sulphone, dimethyl sulphoxide, dimethyl propionamide, N-methyl pyrrolidone and hexamethyl phosphorus amide.

7. Polyurethane polymers prepared by the process which comprises reacting in an inert solvent which dissolves polyacrylonitrile (1) an NCO terminated polymer prepared by reacting (*a*) an excess of an organic diisocyanate with (*b*) an organic compound having a molecular weight of at least about 700 and selected from the group consisting of hydroxyl polyesters prepared by reacting a dihydric alcohol with a dicarboxylic acid, polyalkylene ether glycols, polyalkylene thioether glycols, dihydric polyacetals and dihydric polycarbonates with (2) a compound having the formula

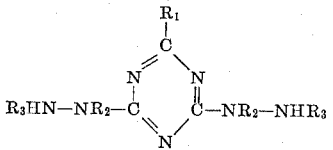

wherein $R_1$ is a member selected from the group consisting of hydrogen, chlorine, —$OR_2$, —$NR_2R_3$, —NH—$NH_2$, alkyl, aryl, aralkyl and cycloalkyl; $R_2$ and $R_3$ are members selected from the group consisting of hydrogen, alkyl, aryl, aralkyl and cycloalkyl, said compound represented by the formula being present in an amount of from about 100 to about 110 mol percent based on the NCO groups present in said NCO terminated polymer.

References Cited

UNITED STATES PATENTS

| 3,216,975 | 11/1965 | Kunde et al. | 260—77.5 |
| 3,265,668 | 8/1966 | Dowbenko et al. | 260—77.5 |
| 3,202,636 | 8/1965 | Windemuth et al. | 260—75 |

FOREIGN PATENTS

| 155,629 | 2/1939 | Austria. |
| 917,450 | 2/1963 | Great Britain. |
| 1,105,157 | 4/1961 | Germany. |
| 1,112,409 | 11/1955 | France. |
| 1,123,467 | 2/1962 | Germany. |
| 1,196,862 | 7/1965 | Germany. |
| 1,200,531 | 9/1965 | Germany. |

DONALD E. CZAJA, *Primary Examiner.*

LEON J. BERCOVITZ, *Examiner.*

F. McKLEVEY, *Assistant Examiner.*